US012505829B2

(12) United States Patent
Aggarwal et al.

(10) Patent No.: US 12,505,829 B2
(45) Date of Patent: Dec. 23, 2025

(54) AUGMENTING RETRIEVAL SYSTEMS WITH USER-PROVIDED PHONETIC SIGNALS

(71) Applicant: Google LLC, Mountain View, CA (US)

(72) Inventors: Vikram Aggarwal, Palo Alto, CA (US); Ambarish Jash, San Francisco, CA (US); Sukhdeep Singh Sodhi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 217 days.

(21) Appl. No.: 18/454,045

(22) Filed: Aug. 22, 2023

(65) Prior Publication Data

US 2025/0069593 A1    Feb. 27, 2025

(51) Int. Cl.
| | | |
|---|---|---|
| *G10L 15/16* | (2006.01) | |
| *G06F 16/2457* | (2019.01) | |
| *G06F 16/638* | (2019.01) | |
| *G10L 15/02* | (2006.01) | |
| *G10L 15/06* | (2013.01) | |
| *G10L 15/22* | (2006.01) | |

(52) U.S. Cl.
CPC ........ *G10L 15/16* (2013.01); *G06F 16/24578* (2019.01); *G06F 16/638* (2019.01); *G10L 15/02* (2013.01); *G10L 15/063* (2013.01); *G10L 15/22* (2013.01)

(58) Field of Classification Search
CPC ....... G10L 15/16; G10L 15/02; G10L 15/063; G10L 15/22; G06F 16/24578; G06F 16/638; G06F 16/3347; G06F 16/38; G06F 16/953; G06N 3/045; G06N 3/08
See application file for complete search history.

(56) References Cited

U.S. PATENT DOCUMENTS

| | | | |
|---|---|---|---|
| 9,940,930 B1 * | 4/2018 | Campbell | ............... G10L 15/22 |
| 12,141,536 B1 * | 11/2024 | Khosla | ................... G06F 40/126 |
| 2011/0054899 A1 * | 3/2011 | Phillips | ................... G10L 15/30 |
| | | | 704/235 |

(Continued)

OTHER PUBLICATIONS

Sacchi Niccolo et al. "Open-Vocabulary Keyword Spotting with Audio and Text Embeddings", interspeech 2019, Sep. 19, 2019 (Sep. 19, 2019), pp. 3362-3366, XP093227154, DOI: 10.21437/Interspeech.2019-1846.

(Continued)

*Primary Examiner* — Michael Colucci
(74) *Attorney, Agent, or Firm* — Honigman LLP; Brett A. Krueger; Grant Griffith

(57) ABSTRACT

A method includes obtaining, from a user device associated with a user, an audio signature, the audio signature extracted from audio data corresponding to a query spoken by the user. The method also includes processing, using a neural network, the audio signature to identify document tokens that match the audio signature within a shared embedding space, the neural network trained to jointly embed audio signatures and document tokens in the shared embedding space. The method also includes retrieving, using the document tokens and the shared embedding space, a set of search results for the query, and providing, for output from the user device, one or more search results from the set of search results to the user.

20 Claims, 4 Drawing Sheets

(56) References Cited

U.S. PATENT DOCUMENTS

2014/0257821 A1* 9/2014 Adams .................... G10L 21/06
                                                            704/275
2017/0371861 A1* 12/2017 Barborak .............. G06F 40/211
2019/0043481 A1*  2/2019 Georges ................. G10L 15/02
2019/0385615 A1* 12/2019 Sharifi ................... G10L 17/00
2022/0157307 A1*  5/2022 Hartung ................. G10L 15/22
2023/0255553 A1*  8/2023 Weston ................ A61B 5/7264
                                                            600/586
2024/0346088 A1* 10/2024 Kattepur ............ G06F 16/9535

OTHER PUBLICATIONS

Warden Pete: "Speech Commands: A Dataset for Limited-Vocabulary Speech Recognition", arXiv, Apr. 9, 2018 (Apr. 9, 2018), pp. 1-11, XP093227157.
International Search Report and Written Opinion issued in related PCT Application No. PCT/US2024/043186, dated Dec. 10, 2024.

* cited by examiner

AUGMENTING RETRIEVAL SYSTEMS WITH USER-PROVIDED PHONETIC SIGNALS

TECHNICAL FIELD

This disclosure relates to augmenting retrieval systems with user-provided phonetic signals.

BACKGROUND

Conventional retrieval systems (e.g., an Internet-based search engine or platform) search for and return one or more search results to a user based on query text provided by the user. When a query is in the form of a query spoken by a user, conventional retrieval systems use automatic speech recognition (ASR) to generate a transcription of the spoken query and then search for and return one or more search results based on the transcription.

SUMMARY

One aspect of the disclosure provides a computer-implemented method for augmenting retrieval systems with user-provided phonetic signals. The computer-implemented method, when executed on data processing hardware, causes the data processing hardware to perform operations including obtaining, from a user device associated with a user, an audio signature, the audio signature extracted from audio data corresponding to a query spoken by the user. The operations also include processing, using a neural network, the audio signature to identify document tokens that match the audio signature within a shared embedding space, the neural network trained to jointly embed audio signatures and document tokens in the shared embedding space. The operations further include retrieving, using the document tokens and the shared embedding space, a set of search results for the query, and providing, for output from the user device, one or more search results from the set of search results to the user.

Implementations of the disclosure may include one or more of the following optional features. In some implementations, the audio signature includes a fixed-length vector. In some examples, the audio signature is computed over a fixed-length portion of the audio data. In some implementations, the audio data corresponding to the query spoken by the user cannot be reconstructed from the audio signature. In some examples, obtaining the audio signature from the user device includes obtaining the audio signature without obtaining the audio data from the user device. In some implementations, the set of search results are retrieved without performing speech recognition on the audio data.

In some examples, a training process trains the neural network to jointly embed the audio signatures and the document tokens in the shared embedding space. Here, the training process includes receiving a plurality of training samples, each particular training sample of the plurality of training samples including respective training audio data representing a corresponding spoken training query paired with one or more corresponding training documents that each represent a respective search result for the corresponding spoken training query. For each training sample of the plurality of training samples, the training process includes: processing, using an audio signature generator, the respective training audio data to extract a respective training audio signature that represents the corresponding spoken training query; for each training document of the one or more corresponding training documents, indexing the training document to extract corresponding training document tokens that represent terms relevant to the training document; and processing, using the neural network, the respective training audio signature and the corresponding training document tokens to train the neural network to jointly embed the respective training audio signature and the corresponding training document tokens in the shared embedding space. In some implementations, corresponding training document tokens indexed from each training document represent terms including at least one of a title, a description, an author, a publication date, a category, or a keyword related to the training document. In some examples, the training process also includes processing, using the neural network, the respective training audio signature and the corresponding training document tokens to teach the audio signature generator to learn how to extract the respective training audio signature.

In some implementations, retrieving, using the obtained document tokens, the set of search results for the query includes: for each particular document token obtained by processing the audio signature, identifying a corresponding set of documents; ranking the documents of the corresponding sets of documents; and identifying the highest ranked documents of the corresponding sets of documents as the one or more search results from the set of search results.

Another aspect of the disclosure provides a system including data processing hardware, and memory hardware in communication with the data processing hardware and storing instructions that, when executed on the data processing hardware, causes the data processing hardware to perform operations. The operations including obtaining, from a user device associated with a user, an audio signature, the audio signature extracted from audio data corresponding to a query spoken by the user. The operations also include processing, using a neural network, the audio signature to identify document tokens that match the audio signature within a shared embedding space, the neural network trained to jointly embed audio signatures and document tokens in the shared embedding space. The operations further include retrieving, using the document tokens and the shared embedding space, a set of search results for the query, and providing, for output from the user device, one or more search results from the set of search results to the user.

Implementations of the disclosure may include one or more of the following optional features. In some implementations, the audio signature includes a fixed-length vector. In some examples, the audio signature is computed over a fixed-length portion of the audio data. In some implementations, the audio data corresponding to the query spoken by the user cannot be reconstructed from the audio signature. In some examples, obtaining the audio signature from the user device includes obtaining the audio signature without obtaining the audio data from the user device. In some implementations, the set of search results are retrieved without performing speech recognition on the audio data.

In some examples, a training process trains the neural network to jointly embed the audio signatures and the document tokens in the shared embedding space. Here, the training process includes receiving a plurality of training samples, each particular training sample of the plurality of training samples including respective training audio data representing a corresponding spoken training query paired with one or more corresponding training documents that each represent a respective search result for the corresponding spoken training query. For each training sample of the plurality of training samples, the training process includes:

processing, using an audio signature generator, the respective training audio data to extract a respective training audio signature that represents the corresponding spoken training query; for each training document of the one or more corresponding training documents, indexing the training document to extract corresponding training document tokens that represent terms relevant to the training document; and processing, using the neural network, the respective training audio signature and the corresponding training document tokens to train the neural network to embed the respective training audio signature and the corresponding training document tokens in the shared embedding space. In some implementations, corresponding training document tokens indexed from each training document represent terms including at least one of a title, a description, an author, a publication date, a category, or a keyword related to the training document. In some examples, the training process also includes processing, using the neural network, the respective training audio signature and the corresponding training document tokens to teach the audio signature generator to learn how to extract the respective training audio signature.

In some implementations, retrieving, using the obtained document tokens, the set of search results for the query includes: for each particular document token obtained by processing the audio signature, identifying a corresponding set of documents; ranking the documents of the corresponding sets of documents; and identifying the highest ranked documents of the corresponding sets of documents as the one or more search results from the set of search results.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Conventional retrieval systems (e.g., an Internet-based search engine or platform) search for and return one or more search results to a user based on query text provided by the user. When a query is in the form of a query spoken by a user (e.g., voice search), conventional retrieval systems use automatic speech recognition (ASR) to generate a transcription of the spoken query and then search for and return one or more search results based on the transcription. However, relying on ASR requires that an underlying ASR system be trained to handle a wider range and greater diversity of spoken queries compared to, for example, digital assistant or transcription applications. Moreover, the applicability of search results depends heavily on the accuracy of the underlying ASR system.

Implementations disclosed herein are directed towards augmenting retrieval systems with user-provided phonetic signals. Here, a user-provided phonetic signal may characterize a query spoken by a user, or an audio signature extracted from audio data representing the spoken query. Notably, retrieval systems as disclosed herein can be augmented with user-provided phonetic signals without having to transcribe the audio data to a human understandable or natural language understanding/processing (NLU/NLP) understandable transcription. That is, retrieval systems as disclosed herein can be augmented to use user-provided phonetic signals without performing ASR on the audio data. Notably, retrieval systems as disclosed herein can be augmented with user-provided phonetic signals without exposing the audio data to the retrieval systems to enhance user privacy and data security. By the same notion, any underlying audio data never needs to be transmitted over networks, thereby reducing bandwidth requirements and never exposing sensitive user data to bad actors.

Figure 1:
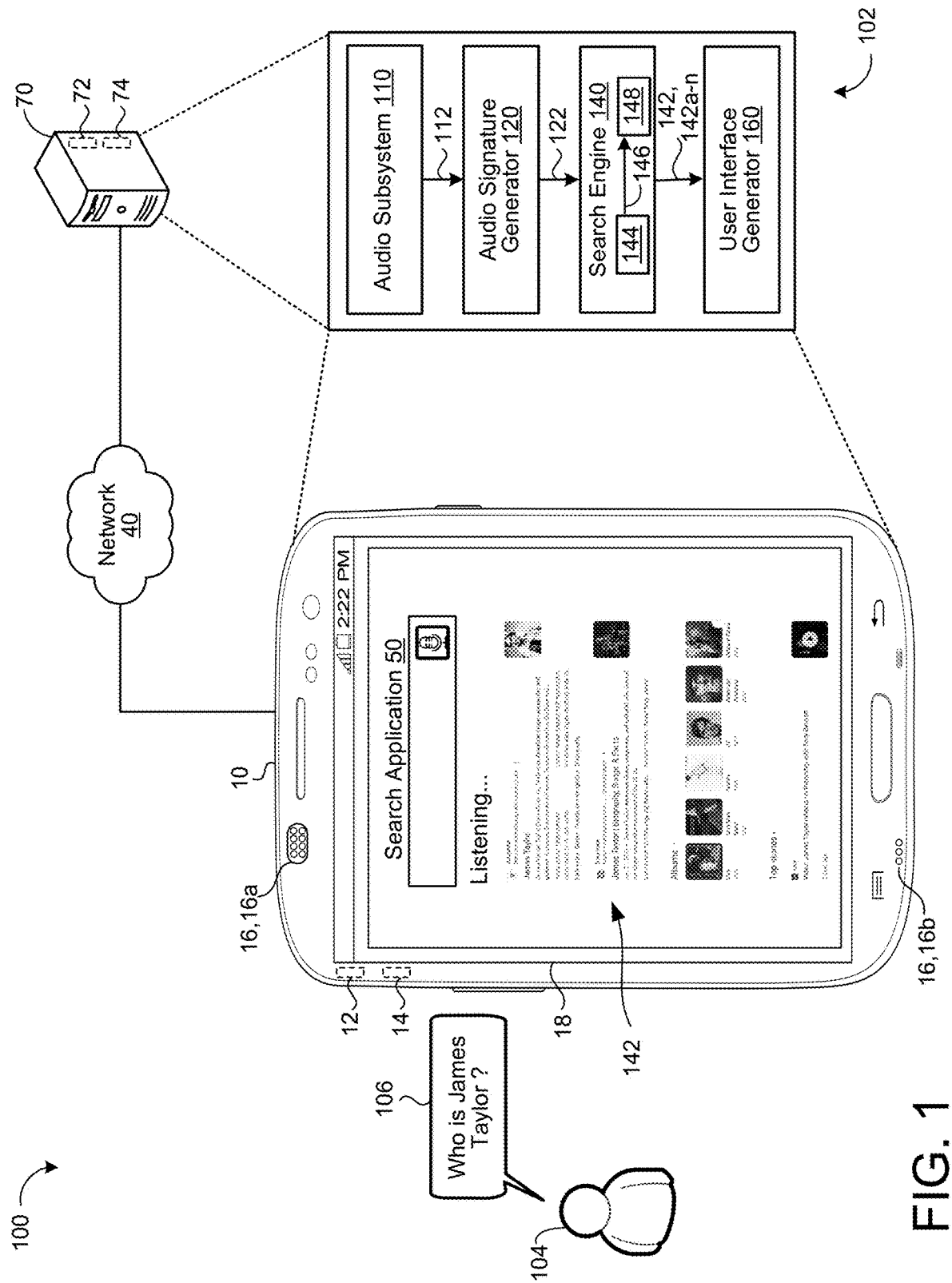
FIG. 1 is a schematic view of an example speech environment using a speech-enabled retrieval system.

FIG. 1 is a schematic view of an example of a speech system 100 using a speech-enabled retrieval system 102 for providing search results based on a query. A user's manner of interacting with a computing device, such as a user device 10, may be through voice input. The user device 10 (also referred to generally as a device 10) is configured to capture sounds (e.g., streaming audio data) from the user 104 within the environment 100. Here, the streaming audio data may represent a spoken utterance 106 by the user 104 that functions, among potentially other purposes, as a spoken query 106 captured by the user device 10. The speech-enabled retrieval system 102 may field the query 106 by retrieving one or more search results 142, 142a-n for the query 106 and providing, for output from the user device 10, the one or more search results 142 to the user 104.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, Internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device 16, 16a (e.g., microphone) for capturing and converting spoken utterances 106 within the environment 100 into electrical signals and an audio output device 16, 16b (e.g., a speaker) for communicating an audible audio signal (e.g., as output audio data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

The user device 10 and/or a remote computing device 70 (e.g., one or more remote servers of a distributed system executing in a cloud-computing environment) in communication with the user device 10 via a network 40 executes an audio subsystem 110 configured to receive the query 106 spoken by the user 104 and captured by the audio capture device 16a, and convert the query 106 into a corresponding digital format associated with audio data 112 capable of being processed by the speech-enabled retrieval system 102 to retrieve the search results 142 for the query 106. The remote computing device 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The speech-enabled retrieval system 102 executes an audio signature generator 120 and a search engine 140. The speech-enabled retrieval system 102 may reside on the user device 10 of the user 104 and/or on the remote computing device 70. For example, the audio signature generator 120 may reside on the user device 10 and the search engine 140 may reside on the remote computing device 70. The audio signature generator 120 is configured to extract an audio signature 122 from the audio data 112 corresponding a query 106. Notably, the audio signature 122 may include a fixed-length vector of floating point numbers. Here the length of the fixed-length vector may not depend on a length or content of the query 106. In some implementations, audio signatures 122 are computed over fixed-length segments/windows of the audio data 112. Notably, the query 106 cannot be reconstructed from the audio signature 122, and the query 106 cannot be transcribed based on the audio signature 122. Here, the audio signature 122 is different from an audio encoding generated by an ASR model. In some examples, an audio signature 122 includes one kilobyte of data, which is substantially less than the amount of data needed to represent the audio data 112. Accordingly, the audio signature 122 can be transmitted to the remote computing device 70 more quickly and efficiently, which enables the speech-enabled retrieval system 102 to more quickly provide search results 142.

The search engine 140 executes a joint embedding model 144 configured to process the audio signature 122 extracted by the audio signature generator 120 to identify one or more document tokens 146 that match the audio signature 122 within a shared embedding space. Here, the joint embedding model 144 may include a neural network trained to jointly embed audio signatures and document tokens in the shared embedding space. During inference, the joint embedding model 144 processes, using the neural network, an audio signature 122 to obtain document tokens 146 that match the audio signature 122 within a shared embedding space. In some implementations, the search engine 140 obtains the audio signature 122 from the user device 10, and provides the search results 142 to the user device 10. Notably, the search engine 140 may obtain the audio signature 122 without having, or being given, access to the audio data 112. Also of note is that the search engine 140 may retrieve the search results 142 without performing speech recognition on the audio data 112 and/or the audio signature 122.

The search engine 140 also executes a page ranker 148 configured to retrieve, using the document tokens 146 and the shared embedding space, a set of search results for the query 106, and provide, for output from the user device 10, one or more search results 142 from the set of search results. Here, the page ranker 148 may rank search results of the set of search results and return the highest ranked search results of the set of search results as the search results 142. In particular, the page ranker 148 may, for each particular document token 146 obtained by processing the audio signature 122, identify a corresponding set of documents, rank the documents of the corresponding sets of documents, and identify the highest ranked documents of the corresponding sets of documents as the one or more search results 142 from the set of search results for the query 106.

The user device 10 and/or the remote computing device 70 also executes a user interface generator 160 configured to provide, for output on a display 18 of the user device 10, the search results 142 to the user 104. In the example shown, the search results 142 are presented as a list, and the user 104 can activate (e.g., by selecting or clicking on) one of the search results 142 to view a corresponding document. Additionally or alternatively, a text-to-speech (TTS) system (not shown) (e.g., executing on any combination of the user device 10 or the remote computing device 70) may convert the search results 142 into synthesized speech for audible output by an audio output device 16b of the user device 10 and/or another device.

Figure 2:
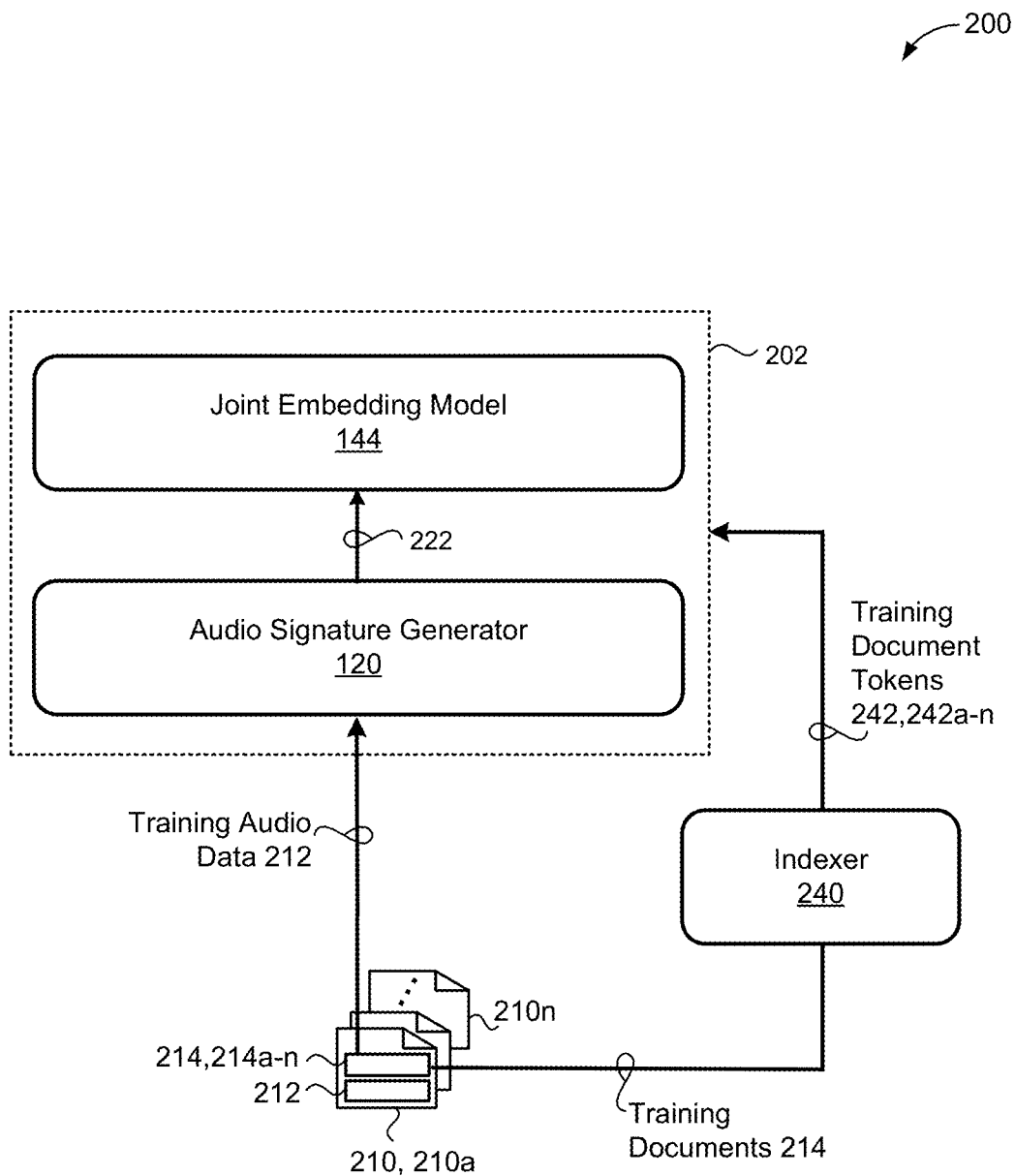
FIG. 2 is a schematic view of an example training process for training a speech-enabled retrieval system to utilize user-provided phonetic signals.

FIG. 2 is a schematic view of an example training process 200 for training a speech-enabled retrieval system 202 to jointly embed audio signatures and document tokens in a shared embedding space. The speech-enabled retrieval system 202 may include the speech-enabled retrieval system 102 that includes the audio signature generator 120 and the joint embedding model 144. The training process 200 may execute on the remote computing device 70 (i.e., on the data processing hardware 72) or on the user device 10 (i.e., on the data processing hardware 12).

The training process 200 trains the speech-enabled retrieval system 202 using a plurality of training samples 210, 210a-n. Here, each training sample 210 includes respective training audio data 212 representing a corresponding spoken training query paired with one or more corresponding training documents 214, 214a-n that each represent a respective search result for the corresponding spoken training query. For each training sample 210 of the plurality of training samples 210, the audio signature generator 120 processes the respective training audio data 212 to extract a respective training audio signature 222 that represents the corresponding spoken training query. For each training document 214 of the one or more corresponding training documents 214, an indexer 240 indexes the training document 214 to extract one or more corresponding training document tokens 242, 242a-n that represent terms relevant to the training document 214. Here, the document tokens 242 may include one or more of a title, a description, an author, a publication date, a category, or a keyword related to the training document. The joint embedding model 144 processes the respective training audio signature 222 and the corresponding training document tokens 242 to teach the audio signature generator 120 to learn how to extract the respective training audio signature 222, and to train the joint embedding model 144 to jointly embed the respective training audio signature 222 and the corresponding training document tokens 242 in the shared embedding space.

Figure 3:
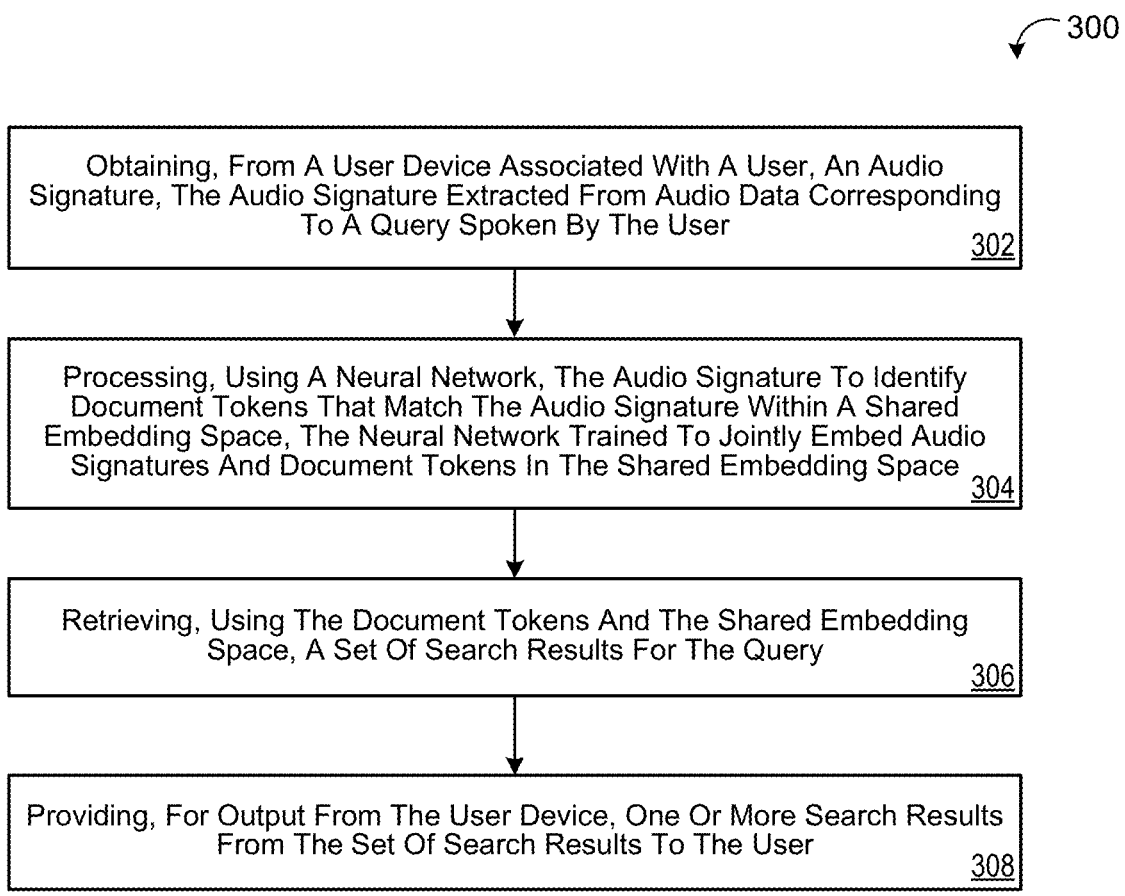
FIG. 3 is a flowchart of an example arrangement of operations for a computer-implemented method of operating a speech-enabled retrieval system to utilize user-provided phonetic signals.

FIG. 3 is a flowchart of an exemplary arrangement of operations for a computer-implemented method 300 for augmenting a retrieval system with user-provided phonetic signals. The operations may be performed by data processing hardware 410 (FIG. 4) (e.g., the data processing hardware 12 of the user device 10 or the data processing hardware 72 of the remote computing device 70) based on executing instructions stored on memory hardware 420 (e.g., the memory hardware 14 of the user device 10 or the memory hardware 74 of the remote computing device 70).

At operation 302, the method 300 includes obtaining, from a user device 10 associated with a user 104, an audio signature 122, the audio signature 122 extracted from audio data 112 corresponding to a query spoken 106 by the user 104. The method 300 includes, at operation 304, processing, using a neural network 144, the audio signature 122 to identify document tokens 146 that match the audio signature 122 within a shared embedding space, the neural network 144 trained to jointly embed audio signatures and document tokens in the shared embedding space. At operation 306, the method 300 includes retrieving, using the document tokens 146 and the shared embedding space, a set of search results for the query. The method 300 includes, at operation 308, providing, for output from the user device 10, one or more search results 142 from the set of search results to the user 104.

Figure 4:
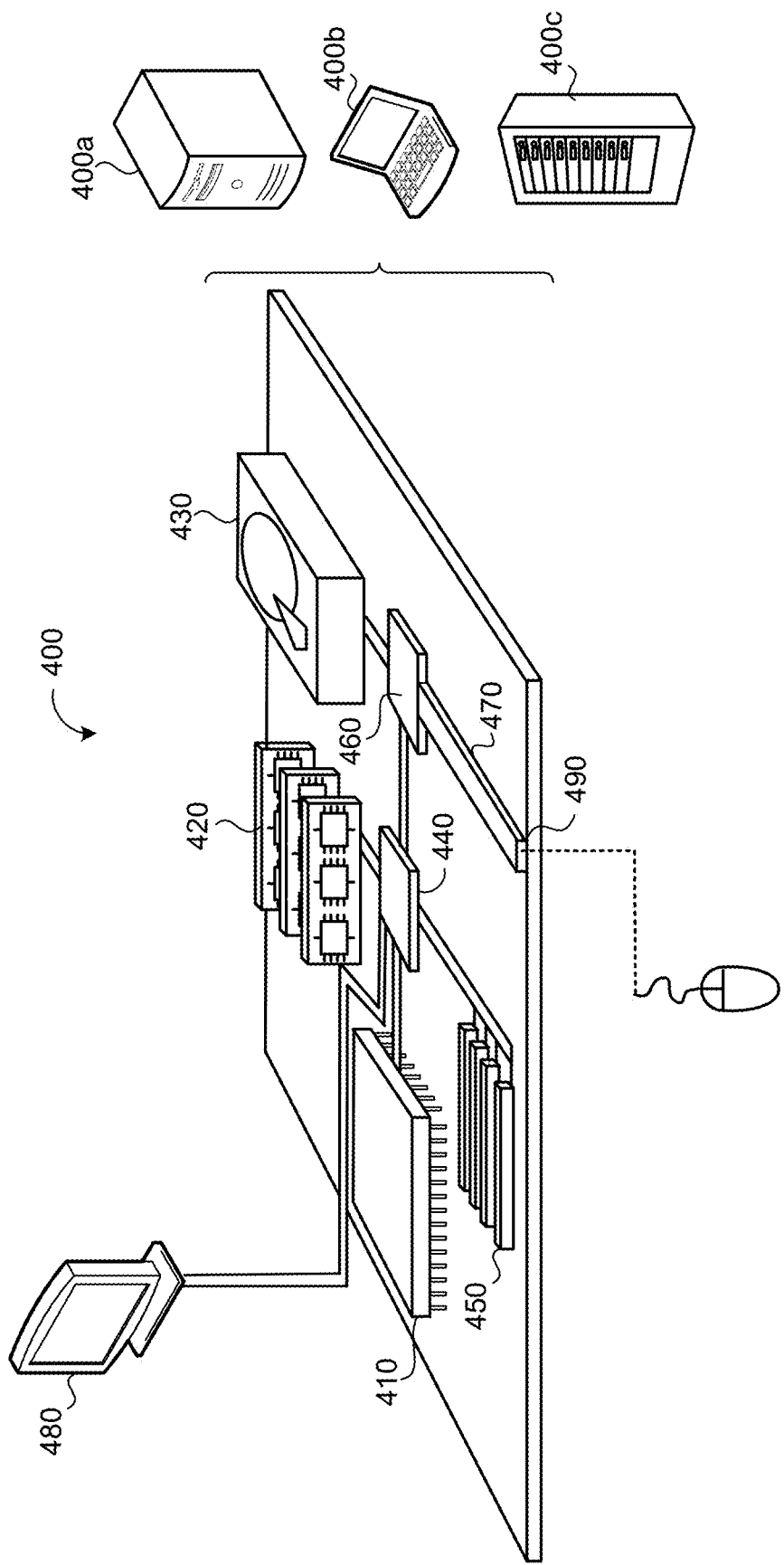
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (i.e., data processing hardware) that can be used to implement the data processing hardware 12 and/or 72, memory 420 (i.e., memory hardware) that can be used to implement the memory hardware 14 and/or 74, a storage device 430 (i.e., memory hardware) that can be used to implement the memory hardware 14 and/or 74, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   obtaining, from a user device associated with a user, an audio signature, the audio signature extracted from audio data without transcribing the audio data, the audio data corresponding to a query spoken by the user, wherein the query cannot be transcribed based on the audio signature;
   processing, using a neural network, the audio signature to identify document tokens that match the audio signature within a shared embedding space, the neural network trained to jointly embed audio signatures and document tokens in the shared embedding space;
   retrieving, using the document tokens and the shared embedding space, a set of search results for the query; and
   providing, for output from the user device, one or more search results from the set of search results to the user.

2. The computer-implemented method of claim 1, wherein the audio signature comprises a fixed-length vector.

3. The computer-implemented method of claim 1, wherein the audio signature is computed over fixed-length segments of the audio data.

4. The computer-implemented method of claim 1, wherein the audio data corresponding to the query spoken by the user cannot be reconstructed from the audio signature.

5. The computer-implemented method of claim 1, wherein obtaining the audio signature from the user device comprises obtaining the audio signature without obtaining the audio data from the user device.

6. The computer-implemented method of claim 1, wherein the set of search results are retrieved without performing speech recognition on the audio data.

7. A computer-implemented method executed on data processing hardware that causes the data processing hardware to perform operations comprising:
   obtaining, from a user device associated with a user, an audio signature, the audio signature extracted from audio data corresponding to a query spoken by the user;
   processing, using a neural network, the audio signature to identify document tokens that match the audio signature within a shared embedding space, the neural network trained to jointly embed audio signatures and document tokens in the shared embedding space;
   retrieving, using the document tokens and the shared embedding space, a set of search results for the query; and
   providing, for output from the user device, one or more search results from the set of search results to the user, wherein a training process trains the neural network to jointly embed the audio signatures and the document tokens in the shared embedding space, the training process comprising:
  receiving a plurality of training samples, each particular training sample of the plurality of training samples comprising respective training audio data representing a corresponding spoken training query paired with one or more corresponding training documents that each represent a respective search result for the corresponding spoken training query; and
  for each training sample of the plurality of training samples:
    processing, using an audio signature generator, the respective training audio data to extract a respective training audio signature that represents the corresponding spoken training query;
    for each training document of the one or more corresponding training documents, indexing the training document to extract corresponding training document tokens that represent terms relevant to the training document; and
    processing, using the neural network, the respective training audio signature and the corresponding training document tokens to train the neural network to jointly embed the respective training audio signature and the corresponding training document tokens in the shared embedding space.

8. The computer-implemented method of claim 7, wherein corresponding training document tokens indexed from each training document represent terms comprising at least one of a title, a description, an author, a publication date, a category, or a keyword related to the training document.

9. The computer-implemented method of claim 7, wherein the training process further comprises processing, using the neural network, the respective training audio signature and the corresponding training document tokens to teach the audio signature generator to learn how to extract the respective training audio signature.

10. The computer-implemented method of claim 1, wherein retrieving, using the obtained document tokens, the set of search results for the query comprises:
  for each particular document token obtained by processing the audio signature, identifying a corresponding set of documents;
  ranking the documents of the corresponding sets of documents; and
  identifying the highest ranked documents of the corresponding sets of documents as the one or more search results from the set of search results.

11. A system comprising:
data processing hardware; and
memory hardware in communication with the data processing hardware, the memory hardware storing instructions that when executed on the data processing hardware cause the data processing hardware to perform operations comprising:
  obtaining, from a user device associated with a user, an audio signature, the audio signature extracted from audio data without transcribing the audio data, the audio data corresponding to a query spoken by the user, wherein the query cannot be transcribed based on the audio signature;
  processing, using a neural network, the audio signature to identify document tokens that match the audio signature within a shared embedding space, the neural network trained to jointly embed audio signatures and document tokens in the shared embedding space;
  retrieving, using the document tokens and the shared embedding space, a set of search results for the query; and
  providing, for output from the user device, one or more search results from the set of search results to the user.

12. The system of claim 11, wherein the audio signature comprises a fixed-length vector.

13. The system of claim 11, wherein the audio signature is computed over fixed-length segments of the audio data.

14. The system of claim 11, wherein the audio data corresponding to the query spoken by the user cannot be reconstructed from the audio signature.

15. The system of claim 11, wherein obtaining the audio signature from the user device comprises obtaining the audio signature without obtaining the audio data from the user device.

16. The system of claim 11, wherein the set of search results are retrieved without performing speech recognition on the audio data.

17. A system comprising:
data processing hardware; and
memory hardware in communication with the data processing hardware, the memory hardware storing instructions that when executed on the data processing hardware cause the data processing hardware to perform operations comprising:
  obtaining, from a user device associated with a user, an audio signature, the audio signature extracted from audio data corresponding to a query spoken by the user;
  processing, using a neural network, the audio signature to identify document tokens that match the audio signature within a shared embedding space, the neural network trained to jointly embed audio signatures and document tokens in the shared embedding space;
  retrieving, using the document tokens and the shared embedding space, a set of search results for the query; and
  providing, for output from the user device, one or more search results from the set of search results to the user,
wherein a training process trains the neural network to jointly embed the audio signatures and the document tokens in the shared embedding space, the training process comprising:
  receiving a plurality of training samples, each particular training sample of the plurality of training samples comprising respective training audio data representing a corresponding spoken training query paired with one or more corresponding training documents that each represent a respective search result for the corresponding spoken training query; and
  for each training sample of the plurality of training samples:
    processing, using an audio signature generator, the respective training audio data to extract a respective training audio signature that represents the corresponding spoken training query;
    for each training document of the one or more corresponding training documents, indexing the training document to extract corresponding training document tokens that represent terms relevant to the training document; and processing, using the neural network, the respective training audio signature and the corresponding training document tokens to train the neural network to jointly embed the respective training audio signature and the corresponding training document tokens in the shared embedding space.

18. The system of claim 17, wherein corresponding training document tokens indexed from each training document represent terms comprising at least one of a title, a description, an author, a publication date, a category, or a keyword related to the training document.

19. The system of claim 17, wherein the training process further comprises processing, using the neural network, the respective training audio signature and the corresponding training document tokens to teach the audio signature generator to learn how to extract the respective training audio signature.

20. The system of claim 11, wherein retrieving, using the obtained document tokens, the set of search results for the query comprises:

for each particular document token obtained by processing the audio signature, identifying a corresponding set of documents;

ranking the documents of the corresponding sets of documents; and identifying the highest ranked documents of the corresponding sets of documents as the one or more search results from the set of search results.

* * * * *